United States Patent [19]

Green et al.

[11] Patent Number: 5,164,700
[45] Date of Patent: Nov. 17, 1992

[54] BUS IMPROVEMENT AVOIDS FRONT TIRE AND BODY DAMAGE

[76] Inventors: Wallace D. Green, P.O. Box 186, Buckeye, Ariz. 85326; Marshall W. Kotterman, 5340 N. 83rd. Ave., Glendale, Ariz. 85302

[21] Appl. No.: 684,683

[22] Filed: Apr. 11, 1991

[51] Int. Cl.$^5$ .............................................. B60Q 1/00
[52] U.S. Cl. .................................. 340/437; 340/436; 340/932.2; 200/61.44; 116/28 A
[58] Field of Search ................... 340/437, 436, 932.2; 200/61.44, DIG. 10; 116/28 A; 180/274

[56] References Cited

U.S. PATENT DOCUMENTS

| 3,018,344 | 1/1962 | Vinci | 340/437 X |
| 4,460,889 | 7/1984 | Elks | 340/437 X |
| 4,618,845 | 10/1986 | Elks | 340/437 |
| 4,967,180 | 10/1990 | Wang | 340/437 X |

Primary Examiner—Jin F. Ng
Assistant Examiner—Jeffery A. Hofsass
Attorney, Agent, or Firm—James F. Duffy

[57] ABSTRACT

In a motor vehicle, for example a bus, sight and sound signals cause the motor vehicle driver to move the motor vehicle steering wheel to avoid a collision of the front or rear tire with the curb adjacent which the driver is parking the motor vehicle, or about which the motor vehicle is turning. The avoidance of such tire/curb collisions dramatically extends the working life of the front and rear tires, particularly the front tire, and generally obviates repeated body repairs caused by proximity induced damages resulting when tires are drawn too close to a curb.

20 Claims, 1 Drawing Sheet

BUS IMPROVEMENT AVOIDS FRONT TIRE AND BODY DAMAGE

BACKGROUND

1. Technical Field of the Invention

The invention relates to improvements in motor vehicles especially to motor vehicles employed as buses. In particular, the invention relates to bus apparatus which inhibits curb-proximity induced damage to a tire or to the body of the bus.

2. Prior Background Art

The invention is useful in motor Vehicles in general. However, the invention as a improvement in a bus has been chosen as the method of its exposition. Busses customarily pull up adjacent to a curb alongside a roadway or in a terminal to allow passengers to more easily board and disembark from the bus. In busses employed today, the bus driver is usually seated forward of, or over, the front wheels of the bus. From this position, it is difficult for the driver to judge the distance between the curbing and the front tire as the bus approaches a curb in preparation for parking parallel to that curb.

The bus driver is generally prohibited from opening the passenger entry door while the bus is in motion. Thus, the driver cannot open the door to obtain an unimpeded view of the curbing at the side of the bus. Only experience gained from repeated attempts at parallel parking enables a driver to parallel park a bus along side a curb without impacting the front wheel tire with the curb in the course of a parking operation. Unfortunately, because of the high turn-over rate of employment in the bus industry, many drivers do not retain their employment long enough to gain sufficient experience to park a bus without incurring damage to a front tire as a result of colliding with or overriding the curb.

Another recurring problem exacerbated by lack of driver experience is damage resulting to the body of the bus when a driver cuts a corner too sharply and rides the rear wheel over a corner curbing. Such incidents are not only damaging to the rear tire, they are potential sources of body damage resulting from contact between the bus body and trees, posts, and other objects on the sidewalk immediately adjacent the curb. Even more serious is the danger presented to pedestrians by such curb jumping incidents.

In head-in parking situations in which the bus is driven forward toward a wheel-stopping structure, here deemed to be generically equivalent to a curb, damage is often caused by the lower extremities of the front of the bus contacting the curb as the front wheels are drawn proximate the curb.

The cost of replacing tires damaged by curbing in the course of parallel parking operations can run into thousands of dollars per bus per month. This means that tires that might last the better part of a year on a heavily traveled bus route may last less than a month because of damage incurred in parallel parking the bus along side curbs. Similarly, some bus companies report that body damage induced by repeated corner-cutting, curb-jumping incidents represents one of their highest avoidable costs of operation. Front end damage resulting from head-in parking operations is generally more unsightly than significant, yet repairs are necessitated as the owners and management of the vehicle are judged by its appearance.

"Curb Feelers," in the form of wires extending from a motor vehicle, are well known for use as proximity alarms to alert the vehicle's driver of that the vehicle is coming too close to the curb. When the feeler wire contacts the curbing, vibrations are communicated through the chassis of the vehicle. The vibrations are audible and, when heard by the driver, induce the driver to steer away from the curb. Unfortunately, such devices do not function effectively when used on buses as the audible vibrations are diluted and absorbed in other, more prominent, vehicle sounds associated with the operation of a bus.

The addition of some other form of sensible alarm to the basic curb feeler, proximity alarm of the prior art has not been effective. Prior art curb feelers suffer extremely short lives when inserted into the operating environment of a bus. The mere addition of a prior art device to the body of a bus, fails to anticipate the extreme usage conditions such a device will be subjected to when compared to the relatively infrequent use such a device will experience when mounted on a family car, or the like.

To solve the problem of damage induced by curb proximity incidents the teachings of the instant invention are directed toward improving the bus itself. The solution derived must be an integral part of the working vehicle itself. It must function in the extremes of road and weather conditions to which the bus as a whole is subjected. It must substitute itself for the front tire or rear tire in making repeated, jarring, damaging contacts with a curb. It must survive such repeated, damaging contacts while continuing to alert the bus driver to steer away from the curb so as to avoid damage to tires or bus body. Its use must obviate damaging contact so as to extend the useful life of a tire mounted on the front or rear wheel of a bus, and avoid repeated body repairs. It must pay for itself many times over by drastically reducing body repair costs and the rate of replacement of tires on a bus to which the solution is applied by essentially eliminating curb-proximity induced damage to the bus front and rear tires and body. Finally, it must alert the driver that the wheel-stop curbing used in head-in parking areas is of a height that can produce front end damage to the motor vehicle if the bus is driven forward sufficiently to achieve wheel contact with the stop curb.

SUMMARY DESCRIPTION OF THE INVENTION

The invention is disclosed and claimed as an improvement in a motor vehicle, the vehicle having a tire subject to repeated, unintended, damage-causing-contact with a curb. Certain of such damage causing contact reduces the nominal useful lifetime of the tire. The motor vehicle includes steering means, the timely steering operation of which can avoid the damage causing contact of the tire with the curb. There is an operator on the motor vehicle in control of the steering means. The improvement comprises sensible signaling means affixed to the motor vehicle for communicating a sensible signal to the operator indicative of the proximity of the tire to the curb. The signal induces the driver to initiate a timely steering operation to avoid damage causing contact of the tire with the curb.

The sensible signaling means, in turn, comprises a weather tight housing affixed to the body of the motor vehicle. The signaling means is affixed to the vehicle's body adjacent the tire. It houses a movable coupling to which is removably coupled a curb-contacting probe. The probe extends outward from the housing to contact any curb proximate the motor vehicle. The curb-contacting probe is a breakage resistant, deformable rod and includes replacement indicating means for indicating that the probe has suffered sufficient wear so as to require replacement.

There is an actuating arm within the housing joined to the movable coupling and movable therewith when the probe moves in response to contact with a curb. Additionally, there are means for producing a sensible signal coupled to the actuating arm, to be actuated thereby, in response to curb contacting movement of the probe, to produce a sensible signal indicative of the tire's proximity to the curb.

The means for producing a sensible signal is shown as comprising an electrically activated signal device, a source of electrical power, and a switch connecting the signal device to the power source. The switch itself is further coupled to the actuation arm to be actuated thereby when the probe contacts a curb.

The signal device may be a light emitting device, an audible sound emitting device, or both.

When the tire in question is the front tire of the motor vehicle drawn closest to a curb in the course of a parking operation, the sensible signaling means is affixed to the motor vehicle adjacent that front tire. When the tire is the rear tire of the motor vehicle drawn closest to a curb in the course of a corner turning operation, the sensible signaling means is affixed to the motor vehicle adjacent that rear tire.

When both the front and the rear tire, as noted above, are considered, a sensible signaling means is affixed to the motor vehicle adjacent each of these tires. Finally, the sensible signaling device is affixed at the front end of the motor vehicle on a line between the front left and the front right tires so as to alert the driver of the motor vehicle of the close proximity of a curb in front of the motor vehicle in the course of a head-in parking operation.

In a presently preferred embodiment, as exemplified by the disclosure herein, the motor vehicle is a bus.

DETAILS OF BEST MODE FOR CARRYING OUT THE INVENTION

Figure 1:
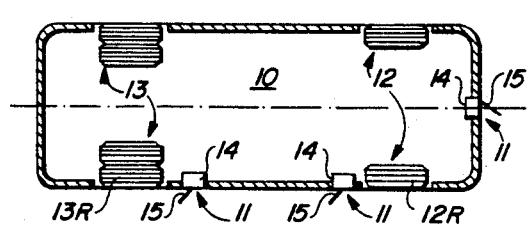
FIG. 1 is a cross-sectional plan view of a motor vehicle showing the improvement which provides a curb sensing, alarm system adjacent front and rear tires of the vehicle, herein exemplified as bus.

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

In FIG. 1 a cross sectional plan view of bus 10 is presented to show the relative positions of front tires 12 and rear tires 13. In particular, right, front tire 12R is located just forward of a first bus-improving, curb sensing alarm 11, and right, rear tire 13R is just aft of a second such bus-improving alarm 11. A third said alarm 11 is located forward of front tires 12L and 12R on a line lying between these two tires. Alarm 11 has a housing 14 removably affixed to the underside of bus 10. A curb contacting probe 15 extends outwardly and downwardly away from bus 10. As will be seen, probe 15 is structured in a manner to complement the hard usage imposed by the frequent approaches to curbing necessitated by commercial bus operations.

Figure 2:
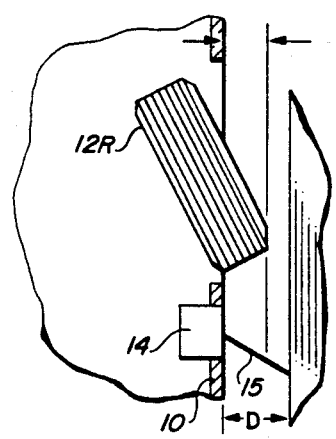
FIG. 2 is a plan view illustrating the relationship between front tire turning extension and length of alarm probe.
Figure 3:
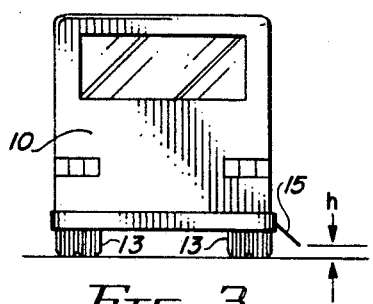
FIG. 3 is an elevation view showing the relationship between ground level and the end of the alarm probe.

Practical considerations determine the length and positioning of probe 15. See FIGS. 2 and 3. As a bus driver draws his bus close to a curb in a parallel parking maneuver, he steers to the left upon approaching the curb so as to bring the bus parallel to the curb. This action causes the rearmost part of tire 13 to extend outward, a distance d away from bus 10. To avoid a damaging collision of tire 13 with a curb, probe 15 must extend outward from bus 10 a greater distance D away from the side of the bus. By way of example, D will exceed d by three or four inches. Thus, if, on a given bus, d equals nine inches, D may typically be selected to be thirteen inches.

The distal end of probe 15 must clear the ground so that false alarms are not triggered as the bus travels. The clearance distance, h in FIG. 3, must not be so great as to cause probe 15 to override, without contact, a curb along side which bus 10 is to be parked. Without implying a limitation, a clearance distance h equal to three inches will generally prove sufficient to assure curb contact and adequate road travel clearance.

Because a bus may be drawn proximate and parallel to a curb hundreds of times each week, it is important that probe 15 be structured to withstand repeated, moving contact with curbing. To this end, probe 15 should be resiliently deformable so as to not be permanently bent out of shape by forces imposed on it as bus 10 moves it into compressive contact with a curb. For example, a probe made of a quarter-inch diameter, sixteen gage wire spring 16 satisfies the resiliently deformable requirements of probe 15. See FIG. 4. It should be further noted that the continual, dragging contact between probe 15 and various curbing along the route of travel of bus 10 cause the end of probe 15 to wear away and the length of probe 15 to be diminished. The improvement here disclosed takes this diminishment into account by providing a wear/replacement indicator. In the presently preferred embodiment, the indicator is comprised of a steel pin 17 captively inserted into spring 16. Pin 17 effectively fills the inner diameter of spring 16 and wears down, with spring 16, as probe 15 is drawn into repeated, moving contact with a curb. When pin 17 has worn away such that the hollow interior of spring 16 is visible, it is time to replace probe 15.

Figure 5:
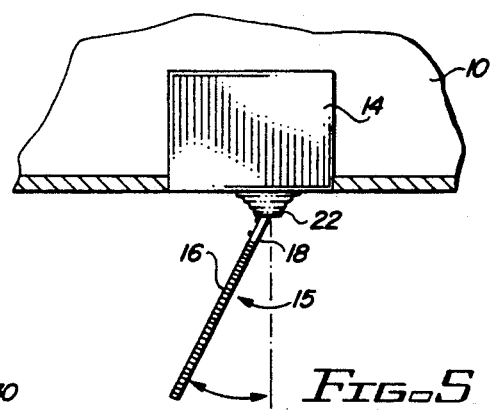
FIG. 5 shows the off-set mounting of the alarm probe to the alarm housing.

To ease the first contact of probe 15 with a curb, the probe will extend outwardly, and be inclined rearwardly as it exits alarm housing 14. See FIG. 5.

The first, second, and third of said bus improving alarms 11 indicated in FIG. 1 all have the same general geometry and structure.

Figures 4, 6:
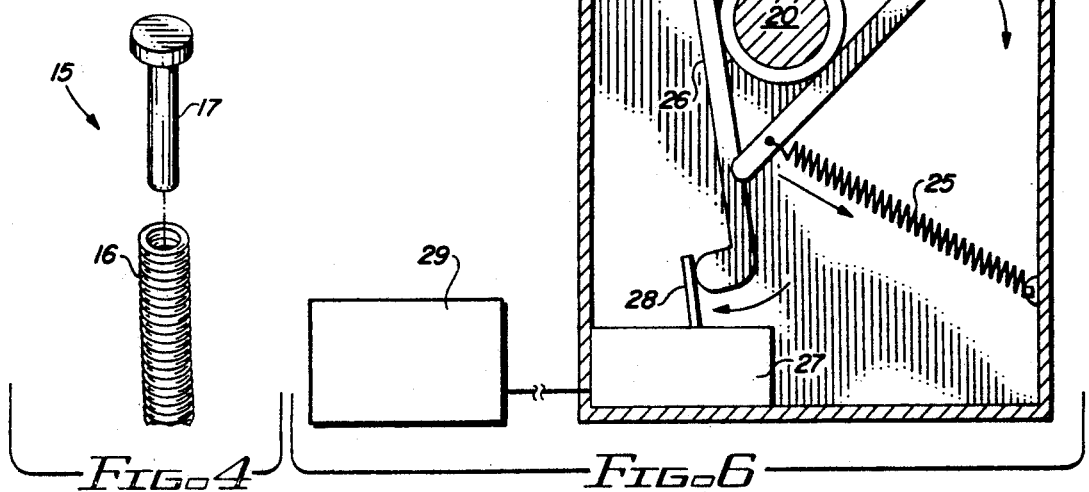
FIG. 4 detail of the alarm probe.
FIG. 6 is a drawing of an exemplary alarm assembly showing the working relationship of the alarm housing, components, and probe.

Details of curb sensing alarm 11 are disclosed in FIG. 6. Housing 14 is a weather tight enclosure, laid open here for purposes of exposition. Probe 15 is again seen as comprising spring rod 16 and wear/replacement indicator, pin 17. Probe 15 is movably coupled to housing 14 in the following manner. By way of example, within housing 14 is pivot post 20 to which is rotatingly coupled ring 19. A probe coupling rod 21 is affixed to ring 19 and extends out of housing 14 through opening 23 in a wall of housing 14. Coupling cylinder 18 internally accepts portions of coupling rod 19 and of spring rod 16 (part of probe 15). Coupling rod 19 and spring rod 16 are screw fastened in place within coupling cylinder 18. Probe 15 is thus movably (pivotally) coupled to pivot post 19. A rubber boot 22 is fitted about coupling rod 21 and fastened to housing 14 to provide a weather seal about opening 23.

The rotation of probe 15 about pivot post 20 is restricted by restraining rod 24 and spring 25. Restraining rod 24 is affixed to ring 19 and is positioned to have one of its ends in contact with a wall of housing 14. When the end of restraining rod 24 is contacting a wall of housing 14, pivot rod 15 can only be rotated about pivot post 20 in a direction which moves the end of restraining rod 24 away from its contact with that wall. The direction is rearward (clockwise) with respect to bus 10 in the illustrations shown.

A second of the ends of restraining rod 24 is coupled via spring 25 to another wall of housing 14. The spring tension of spring 25 urges probe 15 forward, with respect to bus 10, and tends to maintain the first end of restraining rod 24 in contact with the interior wall of housing 14. When probe 15 comes into contact with a curb, pivot 15 rotates rearwardly about pivot pin 20, overcoming the spring tension of spring 25.

Also affixed to ring 19 is actuation rod 26. Actuation rod 26 extends away from ring 19 to come into contact with actuating lever 28 of switch 27. Switch 27 is preferably a SPST microswitch but may be any switch which serves the purpose of activating sensible signaling device 29.

When probe 15 comes into contact with a curb, it pivots about pivot pin 20 causing actuation rod 26 to move so as to depress actuating lever 28 on switch 27 and thereby actuate switch 27. Actuation of switch 27 is by closure of internal contacts. When the contacts close, energy is supplied to sensible signaling device 29 to cause a warning signal to be communicated to the driver that he is drawing too close to a curb, either during a parking maneuver or while turning a corner. A schematic diagram of sensible signaling device 29 is presented in FIG. 7.

Figure 7:
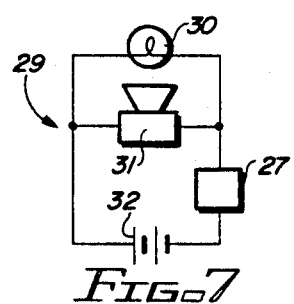
FIG. 7 is a schematic diagram of a sensible signaling circuit used with the alarm assembly of FIG. 6.

Sensible signaling device 29 presents a signal to the driver to alert him to steer the front wheels of the bus away from the curb so as to avoid a collision contact between a tire and the curb or between the bus' body and an object mounted on the sidewalk near the curb. A presently preferred sensible signaling device is depicted in FIG. 7. The device comprises a visual signal, e.g., light emitted by lamp 30 and an audible signal, e.g., sound emitted by oscillator/speaker 31. When probe 15 contacts a curb and its pivotal motion about pivot 20 causes the actuation of switch 27, the switch contacts close and permit current from bus battery 32 to flow through the circuit of sensible signaling device so that lamp 30 lights up and sound is emitted by oscillator/speaker 3Z.

The sight and sound of these signals causes the driver to move the bus steering wheel to avoid a collision of the front tire 12R or rear tire 13R with the curb adjacent which the driver is parking the bus or about which the driver is turning. The avoidance of such tire/curb collisions dramatically extends the working life of the front and rear tire, particularly the front tire, and generally obviates repeated body repairs.

Those skilled in the art will conceive of other embodiments of the invention which may be drawn from the disclosure herein. To the extent that such other embodiments are so drawn, it is intended that they shall fall within the abmit of protection provided by the claims herein.

Having described the invention in the foregoing description and drawings in such clear and concise manner that those skilled in the art may readily understand and practice the invention.

That which is claimed is:

1. In a motor vehicle having a first tire subject to repeated, unintended, damage-causing-contact with a curb, said damage causing contact reducing the nominal useful lifetime of said tire; said motor vehicle including steering means, the timely steering operation of which can avoid said damage causing contact of said tire with said curb; and, an operator on said motor vehicle in control of said steering means; the improvement comprising:

sensible signaling means affixed to said motor vehicle for communicating a sensible signal to said operator indicative of the proximity of said tire to said curb to induce said driver to initiate a timely steering operation to avoid damage causing contact of said tire with said curb;

said sensible signaling means comprising:

a weather tight housing affixed to a movable coupling to which is removably, replacably coupled a curb-contacting probe extending outwardly from said housing to contact any curb proximate said motor vehicle;

said movable coupling comprising a ring rotatingly coupled to a pivot post which post is affixed within said housing;

said curb contacting probe being a resiliently deformable, hollow, wire spring having a first end removably coupled to said ring for pivotal motion about said post;

a spring coupled to said ring and said housing for pivotally urging said probe in a first pivotal direction about said post;

restraining means coupled to said ring for limiting the degree of motion of said probe in said first pivotal direction;

an actuating arm within said housing joined to said movable coupling and movable therewith when said probe moves in response to contact with a curb; and means for producing a sensible signal coupled to said actuating arm, to be actuated thereby, in response to curb contacting movement of said probe, to produce a sensible signal indicative of said tire's proximity to said curb.

2. The improvement of claim 1 wherein said motor vehicle is a bus.

3. The improvement of claim 2, said means for producing a sensible signal comprising an electrically activated signal device, a source of electrical power, and a switch connecting said signal device to said power source, said switch being further coupled to said actuation arm to be actuated thereby when said probe contacts a curb.

4. The improvement of claim 3 wherein said signal device is a light emitting device.

5. The improvement of claim 3 wherein said signal device is an audible sound emitting device.

6. The improvement of claim 3 wherein said signal device comprises a light emitting device and an audible sound emitting device.

7. The improvement of claim 2 wherein said tire is that front tire of said bus drawn closest to a curb in the course of a parking operation, said sensible signaling means being affixed to said bus adjacent said front tire.

8. The improvement of claim 2 wherein said tire is that rear tire of said bus drawn closest to a curb in the course of a corner turning operation, said sensible signaling means being affixed to said bus adjacent said rear tire.

9. The improvement of claim 2 wherein said bus has a second tire;
said first tire is that front tire of said bus drawn closest to a curb in the course of a parking operation, said improvement further including a first said sensible signaling means affixed to said bus adjacent said front tire;
said second tire is that rear tire of said bus drawn closest to a curb in the course of a corner turning operation, said improvement further including a second said sensible signaling means affixed to said bus adjacent said rear tire.

10. The improvement of claim 2 wherein said bus has a second tire, said first tire is a front, left tire and said second tire is a front right tire said sensible signaling device being affixed at the front end of said bus on a line between said front left and said front right tire so as to alert the driver of the bus of the close proximity of a curb in front of said bus in the course of a head-in parking operation.

11. The improvement of claim 1, said means for producing a sensible signal comprising an electrically activated signal device, a source of electrical power, and a switch connecting said signal device to said power source, said switch being further coupled to said actuation arm to be actuated thereby when said probe contacts a curb.

12. The improvement of claim 11 wherein said signal device is a light emitting device.

13. The improvement of claim 11 wherein said signal device is an audible sound emitting device.

14. The improvement of claim 11 wherein said signal device comprises a light emitting device and an audible sound emitting device.

15. The improvement of claim 1 wherein said tire is that front tire of said motor vehicle drawn closest to a curb in the course of a parking operation, said sensible signaling means being affixed to said motor vehicle adjacent said front tire.

16. The improvement of claim 1 wherein said tire is that rear tire of said motor vehicle drawn closest to a curb in the course of a corner turning operation, said sensible signaling means being affixed to said motor vehicle adjacent said rear tire.

17. The improvement of claim 1 wherein said motor vehicle has tire;
said first tire is that front tire of said motor vehicle drawn closest to a curb in the course of a parking operation, said improvement further including a first said sensible signaling means affixed to said motor vehicle adjacent said front tire;
said second tire is that rear tire of said motor vehicle drawn closest to a curb in the course of a corner turning operation, said improvement further including a second said sensible signaling means affixed to said motor vehicle adjacent said rear tire.

18. The improvement of claim 1 wherein said motor vehicle has a second said tire, said first tire is a front, left tire and said second tire is a front right tire said sensible signaling device being affixed at the front end of said motor vehicle on a line between said front left and said front right tire so as to alert the driver of the motor vehicle of the close proximity of a curb in front of said motor vehicle in the course of a head-in parking operation.

19. The improvement of claim 1 wherein said hollow, wire spring curb-contacting probe is breakage resistant but subject to wear due to repeated contact with said curb.

20. The improvement of claim 1 further comprising replacement indicating means coupled to said rod for indicating that said curb-contacting probe has suffered sufficient wear so as to require replacement;
said probe having a distal end;
said replacement indicating means comprising;
a wear indicator pin captively held within said hollow, wire spring forming said probe, said pin wearing away with said probe after repeated contact with said curb,
the absence of said pin within said hollow spring probe, at its distal end, indicating need for probe replacement.

* * * * *